United States Patent
Yoshizawa

(10) Patent No.: US 10,787,588 B2
(45) Date of Patent: Sep. 29, 2020

(54) SOLUTION SET FOR FORMING SURFACE PROTECTIVE RESIN MEMBER AND SURFACE PROTECTIVE RESIN MEMBER

(71) Applicant: FUJI XEROX CO., LTD., Tokyo (JP)

(72) Inventor: Hisae Yoshizawa, Minamiashigara (JP)

(73) Assignee: FUJI XEROX CO., LTD., Tokyo (JP)

(*) Notice: Subject to any disclaimer, the term of this patent is extended or adjusted under 35 U.S.C. 154(b) by 10 days.

(21) Appl. No.: 16/155,238

(22) Filed: Oct. 9, 2018

(65) Prior Publication Data
US 2020/0010716 A1  Jan. 9, 2020

(30) Foreign Application Priority Data
Jul. 4, 2018  (JP) .................................. 2018-127858

(51) Int. Cl.
| | |
|---|---|
| C09D 133/16 | (2006.01) |
| C09D 5/00 | (2006.01) |
| C23C 26/00 | (2006.01) |

(52) U.S. Cl.
CPC ............ C09D 133/16 (2013.01); C09D 5/00 (2013.01); C23C 26/00 (2013.01)

(58) Field of Classification Search
CPC ......................... C09D 133/16; C08G 18/6279
See application file for complete search history.

(56) References Cited

U.S. PATENT DOCUMENTS

| | | | | |
|---|---|---|---|---|
| 5,914,384 A | * | 6/1999 | Anton ................ | C08G 18/6279 428/421 |
| 9,146,506 B2 | * | 9/2015 | Yoshizawa ........... | G03G 15/162 |
| 2011/0200837 A1 | | 8/2011 | Yoshizawa et al. | |
| 2012/0022215 A1 | | 1/2012 | Yoshizawa et al. | |
| 2014/0295139 A1 | | 10/2014 | Miyahara et al. | |
| 2015/0240085 A1 | * | 8/2015 | Klein ................. | C08G 18/6279 416/241 R |

FOREIGN PATENT DOCUMENTS

| | | |
|---|---|---|
| JP | 2001-131463 A | 5/2001 |
| JP | 2002-167422 A | 6/2002 |
| JP | 2002-167423 A | 6/2002 |
| JP | 4283830 B2 | 6/2009 |
| JP | 4283831 B2 | 6/2009 |
| JP | 4383832 B2 | 12/2009 |
| JP | 5051282 B2 | 10/2012 |
| JP | 5870480 B2 | 3/2016 |

OTHER PUBLICATIONS

Machine Translation of JP 2002167423 A (Year: 2020).*
Apr. 29, 2019 Extended Search Report issued in European Patent Application 18203576.6.

* cited by examiner

*Primary Examiner* — Michael M Dollinger
(74) *Attorney, Agent, or Firm* — Oliff PLC

(57) ABSTRACT

Disclosed is a solution set for forming a surface protective resin member, the solution set containing a first solution and a second solution. The first solution contains: an acrylic resin having a hydroxyl value of 40 to 280 and having a fluorine atom-containing group on a side chain of the acrylic resin; and a polyol having a plurality of hydroxyl groups bonded via a carbon chain having 6 or more carbon atoms. The second solution contains a multifunctional isocyanate. In the solution set, a content ratio of the fluorine atom to a total amount of a solid content in the first solution and a solid content in the second solution is 0.5 mass % to 15 mass %.

15 Claims, No Drawings

US 10,787,588 B2

SOLUTION SET FOR FORMING SURFACE PROTECTIVE RESIN MEMBER AND SURFACE PROTECTIVE RESIN MEMBER

CROSS-REFERENCE TO RELATED APPLICATIONS

This application is based on and claims priority under 35 USC 119 from Japanese Patent Application No. 2018-127858 filed on Jul. 4, 2018.

BACKGROUND

Technical Field

The present invention relates to a solution set for forming a surface protective resin member, and a surface protective resin member.

Related Art

Conventionally, in various fields, from the viewpoint of suppressing scratches on the surface, a surface protective resin member such as a surface protective film is provided. Examples of applications of the surface protective resin member include protective membranes for protecting building materials (for example, floor materials, and wall materials), members for automobiles (for example, car interiors, car bodies, and door handles), sporting goods and musical instruments.

For example, JP-B-5870480 discloses "a resin material for use in a member for an image forming device, the resin material being formed by polymerizing: an acrylic resin that has a content ratio (molar ratio) of side chain hydroxyl groups having 10 or more carbon atoms to side chain hydroxyl groups having less than 10 carbon atoms of less than ⅓ (including a case where the side chain hydroxyl groups having 10 or more carbon atoms is not contained); a polyol which has a plurality of hydroxyl groups bonded via a chain having 6 or more carbon atoms; and an isocyanate, at a polymerization ratio where the ratio (B/A) of a total molar amount (B) to a total molar amount (A) is 0.1 to 10, the total molar amount (A) being the molar amount of hydroxyl groups contained in all the acrylic resins used for polymerization, and the total molar amount (B) being the molar amount of hydroxyl groups contained in all the polyols used for polymerization".

JP-B-5051282 discloses "a urethane resin formed by polymerizing: an acrylic resin containing a hydroxyl group; and an isocyanate, wherein the Martens hardness at 150° C. is 1 N/mm² to 200 N/mm², and the return rate at 150° C. is 80% to 100%".

JP-B-4283830 discloses "a coating composition containing: a polydimethylsiloxane copolymer; a caprolactone; and a siloxane, as essential components, wherein the siloxane and the caprolactone are introduced into a skeleton of the polydimethylsiloxane copolymer".

JP-B-4283831 discloses "a coating composition containing: a polydimethylsiloxane copolymer; a caprolactone; and a siloxane, as essential components, wherein the caprolactone is introduced into a skeleton of the polydimethylsiloxane copolymer".

JP-B-4383832 discloses "a coating composition containing: a polydimethylsiloxane copolymer; a caprolactone; and a siloxane, as essential components, wherein the siloxane is introduced into a skeleton of the polydimethylsiloxane copolymer".

JP-A-2002-167423 discloses "a curable resin composition containing: 0.5 part by weight to 80 parts by weight of an acrylic polyol resin (A); and 0.5 part by weight to 50 parts by weight of a polyisocyanate compound (B), as essential components, the acrylic polyol resin (A) being represented by a specific general formula and obtained by using a low-lactone-modified hydroxyalkyl (meth)acrylate composition having a proportion of a monomer in which 2 or more (n≥2) lactones are chained of less than 50% (GPC area %), wherein, the total amount of the (A) and (B) does not exceed 100 parts by weight".

JP-A-2002-167422 discloses "a curable resin composition containing: 50 parts by weight to 90 parts by weight of an acrylic polyol resin (A); and 50 parts by weight to 10 parts by weight of a polyisocyanate compound (B), as essential components, the acrylic polyol resin (A) being represented by a specific general formula and obtained by using a low-lactone-modified hydroxyalkyl (meth)acrylate composition (a) having a proportion of a monomer in which 2 or more (n≥2) lactones are chained of less than 50% (GPC area %), wherein, the total amount of the (A) and (B) does not exceed 100 parts by weight".

JP-A-2001-131463 discloses "a curable resin composition for a paint containing: a vinyl copolymer (A) component containing a silyl group bonded to a hydrolyzable group and a hydroxyl group; a polyfunctional isocyanate compound (B) component; a weak solvent (C) component; and an alkoxysilyl group-modified polybutadiene (D) component represented by a specific general formula and having a number average molecular weight of 1500 to 100000".

SUMMARY

In a surface protective resin member that is provided on a surface of a substrate and plays a role of protection, it is required that the surface protective resin member has a property of repairing a scratch even if the scratch occurs, that is, so-called self-repairing property. On the other hand, it is also required to have formability, which is lamination formability, when another surface protective resin member is to be laminated on the surface of the previously formed surface protective resin member.

Aspect of non-limiting embodiments of the present disclosure relates to provide a solution set for forming a surface protective resin member that is capable of forming a surface protective resin member having a self-repairing property and excellent lamination formability, compared with a case of a solution set containing: a first solution containing an acrylic resin having a hydroxyl value of 40 to 280 and having a fluorine atom, and a polyol having a plurality of hydroxyl groups bonded via a carbon chain having 6 or more carbon atoms; and a second solution containing a polyfunctional isocyanate, a content ratio of the fluorine atom to a total amount of a solid content in the first solution and a solid content in the second solution exceeding 15 mass %.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a solution set for forming a surface protective resin member, the solution set containing a first solution containing:
an acrylic resin having a hydroxyl value of 40 to 280 and having a fluorine atom-containing group on a side chain of the acrylic resin; and
a polyol having a plurality of hydroxyl groups bonded via a carbon chain having 6 or more carbon atoms, and
a second solution containing a multifunctional isocyanate, wherein
a content ratio of the fluorine atom to a total amount of a solid content in the first solution and a solid content in the second solution is 0.5 mass % to 15 mass %.

DETAILED DESCRIPTION

Hereinafter, exemplary embodiments of the present invention are described. The present embodiment is one example of implementing the present invention, and the present invention is not limited to the following embodiments.

<Solution Set for Forming Surface Protective Resin Member>

The solution set for forming a surface protective resin member (hereinafter simply referred to as "solution set") according to the present embodiment contains: a first solution containing an acrylic resin having a hydroxyl value of 40 to 280 and having a fluorine atom-containing group on a side chain thereof (hereinafter simply referred to as "specific acrylic resin") and a polyol having a plurality of hydroxyl groups bonded via a carbon chain having 6 or more carbon atoms (hereinafter simply referred to as "long-chain polyol"); and a second solution containing a multifunctional isocyanate.

The content ratio of the fluorine atom to the total amount of the solid content in the first solution and the second solution is 0.5 mass % to 15 mass %.

In the present specification, the unit of the hydroxyl value is "mgKOH/g", but this unit may be omitted.

The solution set for forming a surface protective resin member according to the present embodiment is used by mixing the first solution and the second solution, that is, the solution set is used as a material for forming a surface protective resin member containing an acrylic-urethane resin. Since the solution set for forming a surface protective resin member according to the present embodiment has the above-described configuration, a surface protective resin member having a self-repairing property and excellent in formability (lamination formability) in laminating the surface protective resin member by coating a mixed solution of the first solution and the second solution on the surface thereof after forming the surface protective resin member.

The reasons for this are presumed as follows.

From the viewpoint of suppressing scratches on the surface, it has been conventionally practiced in various fields to provide a surface protective resin member such as a surface protective film. Examples include a surface protective resin member for various articles such as building materials (for example, floor materials, and wall materials), members for automobiles (for example, car interiors, car bodies, and door handles), sporting goods and musical instruments. A resin member having a property of repairing scratches even if the scratches are caused by scratching or the like, so-called self-repairing property, is used as the surface protective resin member. The surface protective resin member having such self-repairing property further improves the scratch suppression performance by lowering the friction coefficient of the surface, and from the viewpoint of obtaining the antifouling property, a resin member containing a fluorine atom may be used.

Here, in a case where a surface protective resin member is to be formed, a surface protective resin member may be laminated on the surface of a previously formed surface protective resin member. For example, in a case where the surface protective resin member wears out over time and the performance thereof deteriorates, a new surface protective resin member may be laminated on the worn surface protective resin member. Further, in a case where thick surface protective resin members are to be formed, a plurality of surface protective resin members may be laminated.

However, in a case where another surface protective resin member is to be laminated on the previous surface protective resin member containing a fluorine atom as described above, a coating fluid for forming the coated surface protective resin member is repelled and did not spread on the previous surface protective resin member, and thus a coating film having a shape to be formed cannot be obtained. Therefore, a surface protective resin member excellent in formability (lamination formability) when another surface protective resin member is to be laminated on the surface of the previously formed surface protective resin member, and a solution set for forming the same are required.

In contrast, according to the solution set according to the present embodiment, a surface protective resin member having a self-repairing property and excellent lamination formability can be obtained.

First, a resin to be synthesized when the first solution (hereinafter simply referred to as "A solution") and the second solution (hereinafter simply referred to as "B solution") of the solution set according to the present embodiment are mixed and the mixture is cured is described. In a case where the A solution containing a specific acrylic resin (a) and a long-chain polyol (b) and the B solution containing a multifunctional isocyanate (c) are mixed and cured, the OH group in (a) and the OH group in (b) react with the isocyanate group in (c) to form a urethane bond (—NHCOO—), and thereby a polyurethane is synthesized. Accordingly, the specific acrylic resin (a) forms a cross-linked structure via the long-chain polyol (b) and the polyfunctional isocyanate (c), and thereby the formed surface protective resin member is considered to exert a self-repairing property.

In the present embodiment, the specific acrylic resin (a) has a fluorine atom-containing group in the side chain and the content ratio of the fluorine atom is 15 mass % or less to the total amount of the solid content in the A solution and the solid content in the B solution.

The fluorine atom present in the side chain of the specific acrylic resin (a) is considered to be capable of moving flexibly even in the resin structure of the formed surface protective resin member, that is, the side chain portion having a fluorine atom is considered to be exposed on the surface of the resin member and to have mobility of moving inward. Accordingly, in a state where the surface of the surface protective resin member is dry, the fluorine atom is exposed on the surface and the friction coefficient is lowered, so that the scratch suppression performance and the antifouling property are enhanced. On the other hand, in a state where the surface of the resin member is applied with a liquid and is wet, the fluorine atom moves inward the resin member, and the contact angle to the liquid is reduced. Therefore, repelling of the coating liquid applied to the surface of the resin member is suppressed, and the coating liquid is easily spread on the surface of the resin member.

Further, when the content ratio of the fluorine atom to the total solid content is reduced to 15 mass % or less, the absolute amount of the fluorine atom present on the surface of the surface protective resin member is suppressed, and thereby the repelling of the coating liquid is suppressed and the coating liquid is easily spread on the surface of the resin member.

According to these mechanisms, even when another surface protective resin member is to be formed on the surface of the previous surface protective resin member formed by using the solution set according to the present embodiment, a coating film having a desired shape is obtained since the coating fluid is easily spread, that is, the lamination formability is considered to be excellent.

In the present embodiment, a surface protective resin member can be formed, which has such self-repairing property and is excellent in formability (lamination formability) in laminating the surface protective resin member by coating a mixed solution of the first solution (A solution) and the second solution (B solution) on the surface of the previous surface protective resin member after forming the previous surface protective resin member.

Next, each component constituting the first solution (A solution) and the second solution (B solution) in the solution set for forming a surface protective resin member according to the present embodiment is described in detail.

<<First Solution>>

(a) Specific Acrylic Resin

In the present embodiment, a specific acrylic resin having a hydroxyl group (—OH) and having a fluorine atom is used as the acrylic resin. The specific acrylic resin has a hydroxyl value of 40 mgKOH/g to 280 mgKOH/g. The fluorine atom is present on the side chain of the specific acrylic resin.

The specific acrylic resin having a hydroxyl group includes those having a carboxy group in addition to those having a hydroxyl group in the molecular structure.

The hydroxyl group is introduced, for example, by using a polymerizable monomer having a hydroxyl group as a polymerizable monomer to be a raw material of the specific acrylic resin. Examples of the polymerizable monomer having a hydroxyl group include (1) an ethylenic polymerizable monomer having a hydroxy group, such as hydroxymethyl (meth)acrylate, hydroxyethyl (meth)acrylate, hydroxypropyl (meth)acrylate, hydroxybutyl (meth) acrylate, and N-methylolacrylamide.

In addition, (2) an ethylenic polymerizable monomer having a carboxy group, such as (meth)acrylic acid, crotonic acid, itaconic acid, fumaric acid, and maleic acid may be used.

Further, a polymerizable monomer not having a hydroxyl group may be used in combination with the polymerizable monomer having a hydroxyl group to be a raw material of the specific acrylic resin. Examples of the polymerizable monomer not having a hydroxyl group include an ethylenic polymerizable monomer copolymerizable with the polymerizable monomers (1) and (2), for example, alkyl (meth)acrylates such as methyl (meth)acrylate, ethyl (meth)acrylate, n-propyl (meth)acrylate, n-butyl (meth)acrylate, isobutyl (meth)acrylate, 2-ethylhexyl (meth)acrylate, n-octyl (meth)acrylate and n-dodecyl (meth)acrylate.

It is preferable that, in the specific acrylic resin, a proportion of a side chain having 6 or more carbon atoms in a side chain portion thereof among all side chains not containing a fluorine atom and having a hydroxyl group is 5 mol % or less. Further, it is more preferable that the side chain not containing a fluorine atom and having a hydroxyl group in the resin has only 5 or less carbon atoms.

In the specific acrylic resin, the proportion of the side chain having 6 or more carbon atoms in the side chain portion thereof among all the side chains not containing a fluorine atom and having a hydroxyl group is set to 5 mol % or less, so that a surface protective resin member having excellent lamination formability is easily formed. This is because the mobility of the side chain having a fluorine atom is further enhanced.

Therefore, it is preferable that in the polymerizable monomer to be a raw material of the specific acrylic resin, a proportion of the polymerizable monomer having 6 or more carbon atoms in a portion to be a side chain after polymerization among all polymerizable monomers not containing a fluorine atom and having a hydroxyl group is 5 mol % or less. Further, it is more preferable that to use only a polymerizable monomer having 5 or less carbon atoms in a portion to be a side chain after polymerization in the polymerizable monomers not containing a fluorine atom and having a hydroxyl group.

Examples of the polymerizable monomer having a hydroxyl group and not containing a fluorine atom and having 5 or less carbon atoms in a portion to be a side chain include hydroxymethyl (meth)acrylate, hydroxyethyl (meth) acrylate, hydroxypropyl (meth)acrylate, hydroxybutyl (meth)acrylate, N-methylolacrylamide, (meth)acrylic acid, crotonic acid, itaconic acid, fumaric acid, maleic acid, or the like.

It is preferable that a polymerizable monomer not having a hydroxyl group and not containing a fluorine atom and to be a branched chain after polymerization has 5 or less carbon atoms in a portion to be a branched chain. Examples of the above polymerizable monomer include methyl (meth)acrylate, ethyl (meth)acrylate, n-propyl (meth)acrylate, n-butyl (meth)acrylate, isobutyl (meth)acrylate, or the like.

In the present specification, the term "(meth) acrylic acid" is a concept encompassing both acrylic acid and methacrylic acid, and the term "(meth) acrylate" is a concept encompassing both acrylate and methacrylate.

Side Chain Having Fluorine Atom-Containing Group

The specific acrylic resin has a side chain having a fluorine atom-containing group.

The side chain having a fluorine atom-containing group is introduced, for example, by using a polymerizable monomer having a fluorine atom as a polymerizable monomer to be a raw material of the specific acrylic resin. Specifically, the side chain can be introduced by a polymerizable monomer having a fluorine atom-containing group and a vinyl group.

The vinyl group refers to a group represented by a structural formula "$(R^B—)_2C=C(—R^B)—$" (wherein $R^B$ independently represents a hydrogen atom, a fluorine atom, or an alkyl group having 1 to 8 carbon atoms). $R^B$ is preferably a hydrogen atom, a fluorine atom or a methyl group. In this specification, examples of the vinyl group include groups of $CH_2=CH—$, $CH_2=C(CH_3)—$, and $CF_2=CF—$.

Examples of the polymerizable monomer having a fluorine atom-containing group and a vinyl group include 2-(perfluorobutyl)ethyl acrylate, 2-(perfluorobutyl)ethyl methacrylate, 2-(perfluorohexyl)ethyl acrylate, 2-(perfluorohexyl)ethyl methacrylate, perfluorohexylethylene, hexafluoropropene, hexafluoropropene epoxide, perfluoro (propyl vinyl ether) or the like.

It is preferable that the side chain having a fluorine atom-containing group in the specific acrylic resin does not have a group reactive to the long-chain polyol (b) and the polyfunctional isocyanate (c). Therefore, it is preferable that the polymerizable monomer having a fluorine atom to be a raw material of the specific acrylic resin does not have a group reactive to (b) and (c), or that a polymerizable monomer having no group reactive to (b) and (c) remaining after polymerization is used.

The number of carbon atoms of the side chain having a fluorine atom-containing group is, for example, 2 to 20. In addition, the carbon chain in the side chain containing a fluorine atom may be a linear or branched chain.

The number of fluorine atoms contained in one molecule of the polymerizable monomer containing a fluorine atom is not particularly limited, and is preferably 1 to 25, and more preferably 3 to 17.

Content Ratio of Fluorine Atom

In the solution set according to the present embodiment, the content ratio of the fluorine atom to the total amount of the solid content in the first solution and the second solution is 0.5 mass % to 15 mass %, preferably 1 mass % to 10 mass %, and more preferably 2 mass % to 10 mass %.

When the content ratio of the fluorine atom is 15 mass % or less, a surface protective resin member excellent in lamination formability can be formed. On the other hand, when the content ratio of the fluorine atom is 0.5 mass % or less, the scratch suppression performance and the antifouling property are enhanced.

The content ratio of the fluorine atom is adjusted based on the proportion of the polymerizable monomer having a fluorine atom in all the polymerizable monomers for synthesizing the specific acrylic resin, the ratio of the specific acrylic resin to the other components (the long-chain polyol (b) and the multifunctional isocyanate (c), and the like), and the like.

Measurement of the content ratio of the fluorine atom to the total amount of the solid content in the first solution and the solid content in the second solution in the solution set is performed by heating, drying and curing a mixture of the first solution and the second solution and then performing an X-ray photoelectron spectroscopy (XPS) method while etching with cluster argon.

Hydroxyl Value

The specific acrylic resin has a hydroxyl value of 40 mgKOH/g to 280 mgKOH/g. The hydroxyl value is preferably 70 mgKOH/g to 200 mgKOH/g.

When the hydroxyl value is 40 mgKOH/g or more, a polyurethane resin having a high crosslinking density is polymerized, and the self-repairing property is easily improved. On the other hand, when the hydroxyl value is 280 mgKOH/g or less, a polyurethane resin having moderate flexibility can be obtained.

The hydroxyl value of the specific acrylic resin is adjusted by the proportion of the polymerizable monomer having a hydroxyl group in all the polymerizable monomers synthesizing the specific acrylic resin.

The hydroxyl value represents the mass of potassium hydroxide in milligrams required for acetylating the hydroxyl group in 1 g of the sample. The hydroxyl value in the present embodiment is measured according to the method defined in JIS K 0070-1992 (potentiometric titration method). However, when the sample does not dissolve, a solvent such as dioxane or tetrahydrofuran (THF) is used as a solvent.

Molecular Weight

The weight average molecular weight of the specific acrylic resin is preferably 5000 to 100000, and more preferably 10000 to 50000.

When the weight average molecular weight of the specific acrylic resin is 5000 or more, the self-repairing property of the surface protective resin member to be formed is easily enhanced. On the other hand, when the weight average molecular weight of the specific acrylic resin is 100000 or less, a surface protective resin member excellent in flexibility is easily obtained.

The weight average molecular weight of the specific acrylic resin is measured by gel permeation chromatography (GPC). The measurement of the molecular weight by GPC is performed with a tetrahydrofuran (THF) solvent using GPC•HLC-8120 GPC manufactured by Tosoh Corporation as a measuring apparatus, and using a Column•TSK gel Super HM-M (15 cm) manufactured by Tosoh Corporation. The weight average molecular weight is calculated from this measurement result using a molecular weight calibration curve prepared from a monodisperse polystyrene standard sample.

The synthesis of the specific acrylic resin is performed, for example, by mixing the above-mentioned polymerizable monomers, and performing ordinary radical polymerization, ionic polymerization or the like, and followed by purification.

(b) Long-Chain Polyol

The long-chain polyol is a polyol having a plurality of hydroxyl groups (—OH) bonded via a carbon chain having 6 or more carbon atoms (the number of carbon atoms in the straight chain portion bonding the hydroxyl groups). That is, the long-chain polyol is a polyol in which all the hydroxyl groups are bonded via a carbon chain having 6 or more carbon atoms (the number of carbon atoms in the straight chain portion bonding the hydroxyl groups).

The number of functional groups in the long-chain polyol (that is, the number of hydroxyl groups contained in one molecule of the long-chain polyol) may be, for example, in a range of 2 to 5, or may be in a range of 2 to 3.

The carbon chain having 6 or more carbon atoms in the long-chain polyol represents a carbon chain whose number of carbon atoms in the straight chain portion bonding the hydroxyl groups is 6 or more. Examples of the carbon chain having 6 or more carbon atoms include an alkylene group or a divalent group formed by combining one or more of alkylene groups with one or more groups selected from —O—, —C(=O)— and —C(=O)—O—. It is preferable that the long-chain polyol having hydroxyl groups bonded via a carbon chain having 6 or more carbon atoms has a structure of —[CO(CH$_2$)$_{n1}$O]$_{n2}$—H. Here, n1 represents 1 to 10, preferably 3 to 6, and more preferably 5. n2 represents 1 to 50, preferably 1 to 35, more preferably 1 to 10, and still more preferably 2 to 6.

Examples of the long-chain polyol include a bifunctional polycaprolactone diol, a trifunctional polycaprolactone triol, a tetrafunctional or higher functional polycaprolactone polyol or the like.

Examples of the bifunctional polycaprolactone diol include a compound having two groups each having a hydroxyl group in the terminal. The group having a hydroxyl group in a terminal is represented by —[CO(CH$_2$)$_{n11}$O]$_{n12}$—H. Here, n11 represents 1 to 10, preferably 3 to 6, and more preferably 5. n12 represents 1 to 50, preferably 3 to 35. Among these, the compound represented by the following General Formula (1) is preferred.

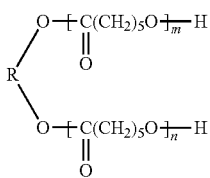

(1)

(In General Formula (1), R represents an alkylene group or a divalent group formed by combining an alkylene group and one or more groups selected from —O— and —C(=O)—, and m and n each independently represents an integer of 1 to 35.)

In General Formula (1), the alkylene group contained in the divalent group represented by R may be linear or branched. The alkylene group is preferably an alkylene group having 1 to 10 carbon atoms, and more preferably an alkylene group having 1 to 5 carbon atoms.

The divalent group represented by R is preferably a linear or branched alkylene group having 1 to 10 carbon atoms (preferably 2 to 5 carbon atoms), or preferably a group formed by linking two linear or branched alkylene groups having 1 to 5 carbon atoms (preferably 1 to 3 carbon atoms) with —O— or —C(=O)— (preferably —O—). Among these, the divalent groups represented by *—$C_2H_4$—*, *—$C_2H_4OC_2H_4$—*, or *—$C(CH_3)_2$—$(CH_2)_2$—* are more preferred. The divalent groups listed above are bonded at the "*" part, respectively.

m and n each independently represent an integer of 1 to 35, preferably 2 to 10, and more preferably 2 to 5.

Examples of the trifunctional polycaprolactone triol include a compound having three groups each having a hydroxyl group in the terminal. The group having a hydroxy group in the terminal is represented by —[CO(CH_2)_{n21}O]_{n22}—H. Here, n21 represents 1 to 10, preferably 3 to 6, and more preferably 5. n22 represents 1 to 50, preferably 1 to 28. Among these, the compound represented by the following General Formula (2) is preferred.

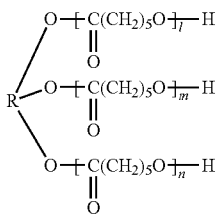

(2)

(In General Formula (2), R represents a trivalent group formed by removing one hydrogen atom from an alkylene group, or a trivalent group formed by combining a trivalent group formed by removing one hydrogen atom from an alkylene group and one or more groups selected from an alkylene group, —O—, and —C(=O)—. l, m, and n each independently represent an integer of 1 to 28, and 1+m+n is 3 to 30.)

In General Formula (2), in a case where R represents the trivalent group formed by removing one hydrogen atom from an alkylene group, the group may be linear or branched. The trivalent group formed by removing one hydrogen atom from an alkylene group is preferably an alkylene group having 1 to 10 carbon atoms, and more preferably an alkylene group having 1 to 6 carbon atoms.

The R may be a trivalent group formed by combing the trivalent group formed by removing one hydrogen atom from an alkylene group shown above and one or more groups selected from an alkylene group (for example, an alkylene group having 1 to 10 carbon atoms), —O—, and —C(=O)—.

The trivalent group represented by R is preferably a trivalent group formed by removing one hydrogen atom from a linear or branched alkylene group having 1 to 10 carbon atoms (preferably 3 to 6 carbon atoms). Among these, the trivalent groups represented by *—$CH_2$—CH(—*)—$CH_2$—*, $CH_3$—C(—*)(~*)—$(CH_2)_2$—*, and $CH_3CH_2C$(—*)(~*)$(CH_2)_3$—* are more preferred. The trivalent groups listed above are bonded at the "*" part, respectively.

l, m and n each independently represent an integer of 1 to 28, preferably 2 to 10, and more preferably 2 to 5. l+m+n is 3 to 30, preferably 6 to 30, and more preferably 6 to 20.

The long-chain polyol may be used alone only, or may be used in combination of two or more types thereof.

The molar ratio [$OH_P/OH_A$] of the content [$OH_P$] of the hydroxyl group contained in the long-chain polyol (b) to the content [$OH_A$] of the hydroxyl group contained in the specific acrylic resin (a) is preferably 0.1 to 10, and more preferably 0.5 to 5.

The long-chain polyol preferably has a hydroxyl value of 30 mgKOH/g to 300 mgKOH/g, and more preferably 50 mgKOH/g to 250 mgKOH/g. When the hydroxyl value is 30 mgKOH/g or more, a polyurethane resin having a high crosslinking density is polymerized, and on the other hand, when the hydroxyl value is 300 mgKOH/g or less, a polyurethane resin having moderate flexibility is easily obtained.

The above hydroxyl value represents the mass of potassium hydroxide in milligrams required for acetylating the hydroxyl group in 1 g of the sample. The above hydroxyl value in the present embodiment is measured according to the method defined in JIS K 0070-1992 (potentiometric titration method). However, when the sample does not dissolve, a solvent such as dioxane or THF is used as a solvent.

<<Second Solution>>

(c) Polyfunctional Isocyanate

The polyfunctional isocyanate (c) is a compound having a plurality of isocyanate groups (—NCO), and reacts with, for example, the hydroxyl group of the specific acrylic resin (a), the hydroxyl group of the long-chain polyol (b), or the like to form a urethane bond (—NHCOO—). In addition, the polyfunctional isocyanate functions as a crosslinking agent for crosslinking between specific acrylic resins (a), between the specific acrylic resin (a) and the long-chain polyol (b), and between the long-chain polyols (b).

Examples of the polyfunctional isocyanate are not particularly limited and include a bifunctional diisocyanate such as methylene diisocyanate, toluene diisocyanate, hexamethylene diisocyanate, and isophorone diisocyanate. In addition, a multimer of hexamethylene polyisocyanate having a burette structure, an isocyanurate structure, an adduct structure, an elastic structure, or the like as is also preferably used.

Commercially available polyfunctional isocyanate may be used, for example, polyisocyanate (DURANATE) manufactured by Asahi Kasei Corporation.

Only one type of the polyfunctional isocyanate may be used, or two or more types thereof may be used by mixing.

The amount of the polyfunctional isocyanate is adjusted such that the proportion of the isocyanate group (—NCO) to the total amount of the hydroxyl groups (—OH) in the specific acrylic resin (a) and the long-chain polyol (b) is preferably 0.8 to 1.6 in terms of molar ratio, and more preferably from 1 to 1.3 in terms of molar ratio.

When the amount of the polyfunctional isocyanate is 0.8 or more in terms of molar ratio, a urethane resin having a high crosslinking density is polymerized and the self-repairing property of the surface protective resin member to be formed is easily enhanced. On the other hand, when the amount of the polyfunctional isocyanate is 1.6 or less in terms of molar ratio, a urethane resin having moderate elasticity is easily obtained.

(e) Other Additives

In the present embodiment, other additives may be contained in the first solution (A solution) or in the second solution (B solution) may be contained. For example, examples of the other additives include an antistatic agent, a reaction accelerator for accelerating the reaction between the hydroxyl group (—OH) in the specific acrylic resin (a) and in the long-chain polyol (b) and the isocyanate group (—NCO) in the polyfunctional isocyanate (c), or the like.

Antistatic Agent

Specific examples of the antistatic agent include cationic surface active compounds (e.g., a tetraalkylammonium salt, a trialkylbenzylammonium salt, an alkylamine hydrochloride, and an imidazolium salt), anionic surface active compounds (e.g., an alkyl sulfonate, an alkyl benzene sulfonate, and an alkyl phosphate), nonionic surfactant compounds (e.g., glycerin fatty acid ester, polyoxyalkylene ether, polyoxyethylene alkyl phenyl ether, N,N-bis-2-hydroxyethylalkylamine, hydroxyalkyl monoethanolamine, polyoxyethylene alkylamine, fatty acid diethanolamide, and polyoxyethylene alkylamine fatty acid ester), amphoteric surfactant compounds (e.g., alkyl betaine and alkyl imidazolium betaine), or the like.

In addition, examples of the antistatic agent include those containing quaternary ammonium.

Specifically, examples include tri-n-butylmethylammonium bistrifluoromethanesulfonimide, lauryl trimethyl ammonium chloride, octyldimethyl ethyl ammonium ethyl sulphate, didecyl dimethyl ammonium chloride, lauryl dimethyl benzyl ammonium chloride, stearyl dimethyl hydroxyethyl ammonium para-toluene sulfonate, tributylbenzylammonium chloride, lauryldimethylaminoacetic acid betaine, lauric acid amidopropyl betaine, octanoic acid amidopropyl betaine, polyoxyethylene stearylamine hydrochloride, or the like Among these, tri-n-butylmethylammonium bistrifluoromethanesulfonimide is preferred.

In addition, an antistatic agent having a high molecular weight may be used.

Examples of the antistatic agent having a high molecular weight include a polymer compound obtained by polymerizing acrylates containing a quaternary ammonium base, a polymer compound based on polystyrene sulfonic acid, a polymer compound based on polycarboxylic acid, a polyetherester-based polymer compound, a polymer compound based on ethylene oxide-epichlorohydrin, a polyetheresteramide-based polymer compound, or the like.

Examples of the polymer compound obtained by polymerizing a quaternary ammonium base-containing acrylate include a polymer compound having at least the following structural unit (A).

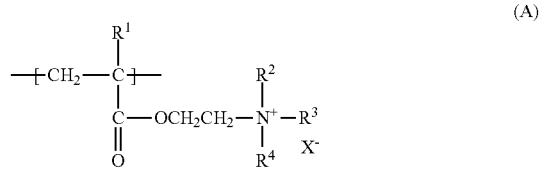

(In structural unit (A), $R^1$ represents a hydrogen atom or a methyl group, $R^2$, $R^3$ and $R^4$ each independently represents an alkyl group, and $X^-$ represents an anion.)

The polymerization of the antistatic agent having a high molecular weight can be performed by a known method.

As the antistatic agent having a high molecular weight, only a polymer compound composed of the same polymerizable monomers may be used, or two or more types of polymer compounds composed of different polymerizable monomers may be used in combination.

It is preferable to adjust the surface resistance of the surface protective resin member formed in the present embodiment to be in the range of $1 \times 10^9 \Omega/\square$ to $1 \times 10^{14} \Omega/\square$, and to adjust the volume resistance thereof to be in the range of $1 \times 10^8$ $\Omega$cm to $1 \times 10^{13}$ $\Omega$cm.

The surface resistance and the volume resistance are measured in accordance with JIS-K6911 under the environment of 22° C. and 55% RH using a HIRESTA UP MCP-450 UR probe manufactured by Dia Instruments Co., Ltd.

The surface resistance and the volume resistance of the surface protective resin member are controlled by adjusting the type, content, or the like of the antistatic agent as long as the antistatic agent is contained.

The antistatic agent may be used alone, or may be used in combination of two or more types thereof Reaction Accelerator Examples of the reaction accelerator for accelerating the reaction between the hydroxyl groups (—OH) in the specific acrylic resin (a) and in the long-chain polyol (b) and the isocyanate groups (—NCO) in the polyfunctional isocyanate (c) include a metal catalyst of tin or bismuth. For examples, NEOSTANN U-28, U-50, U-600 and tin (II) stearate manufactured by NITTO KASEI Co., Ltd., can be mentioned. In addition, XC-C277 and XK-640 manufactured by Kusumoto Chemicals, Ltd. can be mentioned.

Surface Protective Resin Member

First Embodiment

The surface protective resin member according to the first embodiment is a cured product of a mixed solution of the first solution (A solution) and the second solution (B solution) in the solution set for forming a surface protective resin member according to the above embodiment.

The surface protective resin member according to the first embodiment formed by curing the mixed solution of the first solution (A solution) and the second solution (B solution) has a self-repairing property and is excellent in formability (lamination formability) in laminating the surface protective resin member by coating the mixed solution of the first solution and the second solution on the surface thereof after forming the surface protective resin member.

Second Embodiment

The surface protective resin member in the present embodiment is not limited to a mode using the first solution (A solution) and the second solution (B solution).

That is, the surface protective resin member according to the second embodiment is a cured product of: an acrylic resin (specific acrylic resin (a)) having a hydroxyl value of 40 mgKOH/g to 280 mgKOH/g and having a fluorine atom-containing group in the side chain; a polyol (long-chain polyol (b)) having a plurality of hydroxyl groups bonded via a carbon chain having 6 or more carbon atoms; and a multifunctional isocyanate (c), wherein the content ratio of the fluorine atom to the entire surface protective resin member is 0.5 mass % to 15 mass %.

The surface protective resin member according to the second embodiment has a self-repairing property and is excellent in lamination formability by having the above configuration. The reasons for this are presumed as follows.

In a case where the specific acrylic resin (a), the long-chain polyol (b) and the multifunctional isocyanate (c) are cured, the OH group in (a) and the OH group in (b) react with the isocyanate groups in (c) to form urethane bonds (—NHCOO—), and thereby a polyurethane is synthesized. Accordingly, the specific acrylic resin (a) forms a crosslinked structure of urethane via the long-chain polyol (b) and the polyfunctional isocyanate (c), and thereby the formed surface protective resin member is considered to exert a self-repairing property.

In the second embodiment, the specific acrylic resin (a) has a fluorine atom-containing group in the side chain and the content ratio of the fluorine atom to the entire surface protective resin member is 15 mass % or less. The fluorine atom present in the side chain of the specific acrylic resin (a) is considered to be capable of moving flexibly even in the resin structure of the formed surface protective resin member, that is, the side chain portion having a fluorine atom is considered to be exposed on the surface of the resin member and to have mobility of moving inward. Accordingly, in a state where the surface of the surface protective resin member is dry, the fluorine atom is exposed on the surface and the friction coefficient is lowered, so that the scratch suppression performance and the antifouling property are enhanced. On the other hand, in a state where the surface of the resin member is applied with a liquid and is wet, the fluorine atom moves inward the resin member, and the contact angle to the liquid is reduced. Therefore, repelling of the coating liquid applied to the surface of the resin member is suppressed, and spreading is easier.

Further, when the content ratio of the fluorine atom to the entire surface protective resin member is reduced to 15 mass % or less, the absolute amount of the fluorine atom present on the surface of the surface protective resin member is suppressed, and thereby the repelling of the coating liquid is suppressed and the coating liquid is easily spread.

According to these mechanisms, even when another surface protective resin member is to be formed on the previous surface of the surface protective resin member according to the second embodiment, a coating film having a desired shape is obtained since the coating fluid is easily spread, that is, the lamination formability is considered to be excellent.

In the surface protective resin member according to the second embodiment, the content ratio of the fluorine atom to the entire surface protective resin member is 0.5 mass % to 15 mass %, and more preferably 1 mass % to 10 mass %.

When the content ratio of the fluorine atom is 15 mass % or less, a surface protective resin member excellent in lamination formability can be formed. On the other hand, when the content ratio of the fluorine atom is 0.5 mass % or less, the scratch suppression performance and the antifouling property are enhanced.

The measurement of the content ratio of the fluorine atom to the entire surface protective resin member is the same as the measurement of the content ratio of the fluorine atom to the total amount of the solid content in the first solution and the solid content in the second solution (that is, the measurement of a cured product obtained by heating, drying and curing the mixture of the first solution and the second solution).

Third Embodiment

The surface protective resin member according to the third embodiment is a cured product of a group of polymerization components containing in a total amount of 90 mass % or more of: an acrylic resin (hereinafter simply referred to as "acrylic resin (a')"); a polyol (long-chain polyol (b)) having a plurality of hydroxyl groups bonded via a carbon chain having 6 or more carbon atoms; and a multifunctional isocyanate (c), and further containing a polymerization component containing at least a fluorine atom, wherein a difference $[\theta_{dry}]-[\theta_{wet}]$, between a surface contact angle $[\theta_{dry}]$ of first water droplets and a surface contact angle $[\theta_{wet}]$ of second water droplets is 1° to 20°. The first water droplet is dropped on the surface of the surface protective resin member after standing for 10 hours under an environment of 23° C. and 50% RH. The second water droplet is dropped on the surface of the surface protective resin member that is allowed to: stand for 10 minutes with the first water droplet; wipe the first water droplet from a surface thereof; and stand under an environment of 23° C. and 50% RH for 1 minute after wiping the first water droplet.

The surface protective resin member according to the third embodiment has a self-repairing property and is excellent in lamination formability by having the above configuration. The reasons for this are presumed as follows.

First, in the surface protective resin member according to the third embodiment, the fluorine atom is introduced by curing a polymerization component group containing a polymerization component containing a fluorine atom. Examples of the polymerization component containing a fluorine atom include an acrylic resin containing a fluorine atom (specifically, an acrylic resin having a fluorine atom-containing group in the side chain, or the like), a compound containing a fluorine atom and having a group reactive to an isocyanate group (specifically, a perfluoroalkyl monoalcohol, or the like), or the like.

For example, in a case where the acrylic resin (a') having a fluorine atom-containing group in the side chain is used and the acrylic resin (a'), the long-chain polyol (b) and the polyfunctional isocyanate (c) are cured, the OH group in (a') and the OH group in (b) react with the isocyanate groups in (c) to form a urethane bonds (—NHCOO—), and thereby a polyurethane is synthesized. Accordingly, the acrylic resin (a') forms a crosslinked structure via the long-chain polyol (b) and the polyfunctional isocyanate (c), and thereby the formed surface protective resin member is considered to exert a self-repairing property.

In addition, in a case where an acrylic resin (a') not containing a fluorine atom is used, a cured product that can exhibit the same effect can be obtained by adding, for example, a perfluoroalkyl monoalcohol or the like. That is, the perfluoroalkyl group can be bonded to the acrylic resin (a') or the long-chain polyol (b) via the urethane bond of the OH group in the perfluoroalkyl monoalcohol and the isocyanate group in (c). Therefore, the same effect is exhibited as in the case of using the acrylic resin (a') having a side chain containing a fluorine atom.

The perfluoroalkyl monoalcohol used here may be linear or branched, but in particular, the perfluoroalkyl monoalcohol is preferably linear and has 6 or more carbon atoms.

In the third embodiment, the difference $[\theta_{dry}]-[\theta_{wet}]$, between the surface contact angle $[\theta_{dry}]$ and the surface contact angle $[\theta_{wet}]$ is 1 or more. That is, in a state where the surface of the surface protective resin member is dry, the contact angle increases and the friction coefficient decreases, so that the scratch suppression performance and the antifouling property are enhanced. On the other hand, in a state where the surface of the resin member is applied with a liquid and is wet, the contact angle to liquid is reduced, so that the repelling of the coating liquid applied to the surface of the resin member is suppressed, and the coating fluid is easily spread. Accordingly, even when another surface protective resin member is to be formed on the surface of the previous surface protective resin member according to the third embodiment, a coating film having a desired shape is obtained since the coating fluid is easily spread, that is, the lamination formability is considered to be excellent.

Contact Angle

Here, methods for measuring the surface contact angle $[\theta_{dry}]$ and the surface contact angle $[\theta_{wet}]$ are described in more detail.

As for the measurement of the surface contact angle $[\theta_{dry}]$, first, a surface protective resin member to be measured is placed in an environment of 23° C. and 50% RH for 10 hours and is subject to equilibration. After the equilibration, 3 µl of water droplets (first water droplets) are dropped on the surface of the surface protective resin member and the contact angle is immediately measured, so as to obtain the surface contact angle $[\theta_{dry}]$.

Subsequently, as for the measurement of the surface contact angle $[\theta_{wet}]$, after the surface contact angle $[\theta_{dry}]$ is measured, the surface protective resin member with the first droplets is allowed to stand for 10 minutes, then the first droplets are wiped off from the surface protective resin member, and the surface protective resin member is allowed to stand in an environment of 23° C. and 50% RH for 1 minute. Thereafter, another 3 µl of water droplets (second water droplets) are dropped on the surface of the surface protective resin member and the contact angle is immediately measured, so as to obtain the surface contact angle $[\theta_{wet}]$.

The contact angle is measured using a contact angle meter (model number: CA-X, manufactured by Kyowa Interface Science Co., Ltd.) at 23° C.

The difference $[\theta_{dry}]-[\theta_{wet}]$ of the surface protective resin member according to the third embodiment is preferably 1° to 20°, and more preferably 1° to 10°. When the difference $[\theta_{dry}]-[\theta_{wet}]$ is 1° or more, the lamination formability is excellent, and on the other hand, when the difference $[\theta_{dry}]-[\theta_{wet}]$ is 20° or less, the antifouling property is excellent even when the surface of the surface protective resin member is wetted by a liquid.

In the surface protective resin member according to the third embodiment, the surface contact angle $[\theta_{wet}]$ is preferably 85° to 130°, and more preferably 95° to 110°.

When the surface contact angle $[\theta_{wet}]$ is 130° or less, the lamination formability is easily enhanced, and on the other hand, when the surface contact angle $[\theta_{wet}]$ is 85° or more, the antifouling property is enhanced even when the surface of the surface protective resin member is wetted by a liquid.

In addition, in the surface protective resin member according to the third embodiment, the surface contact angle $[\theta_{dry}]$ is preferably 90° to 140°, and more preferably 95° to 130°.

When the surface contact angle $[\theta_{dry}]$ is 90° or more, the antifouling property is enhanced in a state where the surface of the surface protective resin member is dry, and on the other hand, when the surface contact angle $[\theta_{dry}]$ is 140° or less, lamination is easier.

In the surface protective resin member according to the first embodiment and the second embodiment, the surface contact angle $[\theta_{wet}]$, the surface contact angle $[\theta_{dry}]$ and the difference $[\theta_{dry}]-[\theta_{wet}]$ are also preferably within the above ranges.

A method for controlling the difference $[\theta_{dry}]-[\theta_{wet}]$ of the surface protective resin member in the above range is not particularly limited, and examples thereof include a method of applying the surface protective resin member according to the first embodiment or the second embodiment as a surface protective resin member.

In addition, a method for controlling the surface contact angle $[\theta_{wet}]$ and the surface contact angle $[\theta_{dry}]$ of the surface protective resin member in the above range respectively is not particularly limited, and examples thereof include a method of applying the surface protective resin member according to the first embodiment or the second embodiment as a surface protective resin member.

Formation of Surface Protective Resin Member

Here, the surface protective resin members according to the first embodiment, the second embodiment and the third embodiment can be formed by, for example, the following method. Hereinafter, a method of forming the surface protective resin member (a polymerization method of the resin) according to the present embodiment is described by giving a specific example.

For example, the A solution containing the specific acrylic resin (a) and the long-chain polyol (b) and the B solution containing the polyfunctional isocyanate (c) are prepared. The A solution and the B solution are mixed, the mixture is defoamed under reduced pressure, and then the mixture is casted on a base material (for example, a polyimide film, an aluminum plate, and a glass plate) to form a resin layer. Next, the mixture is heated (for example, at 85° C. for 60 minutes, and then at 130° C. for 0.5 hours) and cured to form the surface protective resin member.

However, in the present embodiment, the method of forming the surface protective resin member is not limited to the above method. For example, in a case of using blocked polyfunctional isocyanate, it is preferable to cure by heating at a temperature at which the block is detached. Alternatively, the polymerization may be performed by methods of using ultrasonic waves instead of defoaming under reduced pressure, or allowing the mixed solution to stand for defoaming.

The thickness of the surface protective resin member is not particularly limited, and may be, for example, 1 µm to 100 µm and may be 10 µm to 30 µm.

Martens Hardness

The surface protective resin members according to the present embodiments (the first, second and third embodiments) preferably have a Martens hardness at 23° C. of 0.5 N/mm² to 220 N/mm², more preferably 1 N/mm² to 80 N/mm², still more preferably 1 N/mm² to 70 N/mm², and even more preferably 1 N/mm² to 5 N/mm². When the Martens hardness (23° C.) is 0.5 N/mm² or more, the shape required for the resin member can be easily maintained. On the other hand, when the Martens hardness (23° C.) is 220

N/mm² or less, the ease of repairing a scratch (that is, self-repairing property) is easily improved.

Return Rate

The surface protective resin members according to the present embodiments (the first, second and third embodiments) preferably has a return rate at 23° C. of 70% to 100%, more preferably 80% to 100%, and even more preferably 90% to 100%. The return rate is an index indicating the self-repairing property of the resin material (the property of restoring the strain generated by the stress within 1 minute after unloading the stress, that is, the degree of repairing a scratch). That is, when the return rate (23° C.) is 70% or more, the ease of repairing a scratch (that is, self-repairing property) is improved.

The Martens hardness and the return rate of the surface protective resin member are adjusted, for example, by controlling the hydroxyl value of the specific acrylic resin (a) or the acrylic resin (a'), the number of carbon atoms in the chain linking the hydroxyl groups in the long-chain polyol (b), the ratio of the long-chain polyol (b) to the specific acrylic resin (a) or the acrylic resin (a'), the number of functional groups (isocyanate groups) in the polyfunctional isocyanate (c), and the ratio of the polyfunctional isocyanate (c) to the specific acrylic resin (a) or the acrylic resin (a').

The Martens hardness and the return rate is measured by using FISCHER SCOPE HM 2000 (manufactured by Fischer Instruments Co., Ltd.) as a measuring device, fixing a surface protective resin member (sample) to a slide glass with an adhesive and setting the two in the above measuring device. The surface protective resin member is loaded with 0.5 mN at a specific measurement temperature (23° C., for example) for 15 seconds, and held at 0.5 mN for 5 seconds. The maximum displacement at this time is set to be (h1). Thereafter, the load is reduced to 0.005 mM for 15 seconds, and held at 0.005 mN for 1 minute. The return rate [(h1−h2)/h1]×100(%) is calculated, (h2) being the displacement when held at 0.005 mN for 1 minute. From the load displacement curve at this time, the Martens hardness can be obtained.

[Application]

The surface protective resin members according to the present embodiments (the first, second and third embodiments) can be used as a surface protective member for an object having a possibility of causing scratches on the surface due to contact with foreign matter, for example.

Specifically, the surface protective resin member can be applied in screens and bodies other than screens in portable devices (e.g., mobile phones, and portable game machines), screens of touch panels, building materials (e.g., flooring materials, tiles, wall materials, and wallpaper), automobile members (e.g., car interiors, car bodies, and door handles), storage containers (e.g., suitcases), cosmetic containers, glasses (e.g., frames and lenses), sporting goods (e.g., golf clubs and rackets), writing utensils (e.g., fountain pens), musical instruments (e.g., an exterior of a piano), clothes storage tool e.g., hanger), members (e.g., a transfer member such as a transfer belt) for an image forming device such as a copying machine, leather goods (e.g., bags and school bags), decorative films, film mirrors, or the like.

EXAMPLE

Hereinafter, the exemplary embodiment is described in more detail with reference to Examples and Comparative Examples, but the present invention is not limited to the following examples. In the following, "part" is on a mass basis unless otherwise specified particularly.

Example 1

<Synthesis of Acrylic Resin Prepolymer A1>

Polymerizable monomers of n-butyl methacrylate (nBMA), hydroxyethyl methacrylate (HEMA) and an acrylic monomer having fluorine atom-containing group and a vinyl group (FAMAC 6, manufactured by UNIMATEC CO., LTD.) are mixed in a molar ratio of 2.5:3:0.5. Further, a polymerizable monomer solution is prepared by adding a polymerization initiator (azobisisobutyronitrile (AIBN)) having a polymerizable monomer ratio of 2 mass % and methyl ethyl ketone (MEK) having a polymerizable monomer ratio of 40 mass %.

The polymerizable monomer solution is charged into a dropping funnel and added dropwise to MEK, having a polymerizable monomer ratio of 50 mass % heated to 80° C., under a nitrogen reflux over 3 hours for polymerization. Further, a solution containing MEK having a polymerizable monomer ratio of 10 mass % and AIBN having a polymerizable monomer ratio of 0.5 mass % is added dropwise over 1 hour to complete the reaction. During the reaction, the temperature is kept at 80° C. and stirring is continued. Thus, an acrylic resin prepolymer A1 is synthesized.

The hydroxyl value of the obtained acrylic resin prepolymer A1 is measured according to the method defined in JIS K 0070-1992 (potentiometric titration method), and as a result, the hydroxyl value is 175 mgKOH/g.

In addition, the weight average molecular weight of the acrylic resin prepolymer A1 is measured by the above method using gel permeation chromatography (GPC), and as a result, the weight average molecular weight is 19000.

<Preparation of A1 Solution>

The following components are mixed to prepare an A1 solution.

Acrylic resin prepolymer A1 solution (solid content of 50 mass %): 4.0 parts

Long-chain polyol (polycaprolactone triol, PLACCEL 308, manufactured by Daicel Corporation, having a molecular weight of 850 and a hydroxyl value of 190 mgKOH/g to 200 mgKOH/g): 3.6 parts <Formation of Resin Layer A1>

The following B1 solution is added to the following A1 solution and defoamed under reduced pressure for 10 minutes. The resultant is casted on a 90 μm-thick aluminum plate and cured at 85° C. for 1 hour and then at 130° C. for 30 minutes to obtain a resin layer A1 with a film thickness of 40

The above A1 solution: 7.6 parts

B1 solution (polyfunctional isocyanate, DURANATE TPA 100, manufactured by Asahi Kasei Chemicals Corporation, compound name: polyisocyanurate form of hexamethylene diisocyanate): 3.8 parts The content ratio of the fluorine atom to the total amount of the solid content in the A1 solution and the B1 solution is 2.7 mass %. In addition, the content ratio of the fluorine atom in the entire resin layer A1 is also 2.7 mass %.

The molar ratio [$OH_P/OH_A$] of the content [$OH_P$] of the hydroxyl group contained in the long-chain polyol to the content [$OH_A$] of the hydroxyl group contained in the acrylic resin prepolymer A1 is 2.

Example 2

An acrylic resin prepolymer A2 is synthesized in the same manner as in Example 1, except that the molar ratio of polymerizable monomers, n-butyl methacrylate (nBMA) in synthesis of the acrylic resin prepolymer A1, hydroxyethyl methacrylate (HEMA), and an acrylic monomer having fluorine atom-containing group and a vinyl group (FAMAC 6, manufactured by UNIMATEC CO., LTD.) in Example 1 is changed to 2:3:1.

Further, a resin layer A2 is obtained in the same manner as in Example 1 except that the acrylic resin prepolymer A2 is used.

The hydroxyl value of the acrylic resin prepolymer A2 is 152 mgKOH/g.

The weight average molecular weight of the acrylic resin prepolymer A2 is 18100.

The content ratio of the fluorine atom to the total amount of the solid content in the A2 solution and the B1 solution is 5.5 mass %. In addition, the content ratio of the fluorine atom in the entire resin layer A2 is also 5.5 mass %.

The molar ratio $[OH_P/OH_A]$ between the content $[OH_A]$ of the hydroxyl group contained in the acrylic resin prepolymer A2 and the content $[OH_P]$ of the hydroxyl group contained in the long-chain polyol is 2.

Example 3

An acrylic resin prepolymer A3 is synthesized in the same manner as in Example 1, except that the molar ratio of polymerizable monomers, n-butyl methacrylate (nBMA) in synthesis of the acrylic resin prepolymer A1, hydroxyethyl methacrylate (HEMA), and an acrylic monomer having fluorine atom-containing group and a vinyl group (FAMAC 6, manufactured by UNIMATEC CO., LTD.) in Example 1 is changed to 2.7:3:0.3.

Further, a resin layer A3 is obtained in the same manner as in Example 1 except that the acrylic resin prepolymer A3 is used.

The hydroxyl value of the acrylic resin prepolymer A3 is 186 mgKOH/g.

The weight average molecular weight of the acrylic resin prepolymer A3 is 15800.

The content ratio of the fluorine atom to the total amount of the solid content in the A3 solution and the B1 solution is 1.5 mass %. In addition, the content ratio of the fluorine atom in the entire resin layer A3 is also 1.5 mass %.

The molar ratio $[OH_P/OH_A]$ between the content $[OH_A]$ of the hydroxyl group contained in the acrylic resin prepolymer A3 and the content $[OH_P]$ of the hydroxyl group contained in the long-chain polyol is 2.2.

Example 4

An acrylic resin prepolymer A4 is synthesized in the same manner as in Example 1, except that the molar ratio of polymerizable monomers, n-butyl methacrylate (nBMA) in synthesis of the acrylic resin prepolymer A1, hydroxyethyl methacrylate (HEMA), and an acrylic monomer having fluorine atom-containing group and a vinyl group (FAMAC 6, manufactured by UNIMATEC CO., LTD.) in Example 1 is changed to 1.8:2:2.2.

Further, a resin layer A4 is obtained in the same manner as in Example 1 except that the acrylic resin prepolymer A4 is used.

The hydroxyl value of the acrylic resin prepolymer A4 is 77 mgKOH/g.

The weight average molecular weight of the acrylic resin prepolymer A4 is 19000.

The content ratio of the fluorine atom to the total amount of the solid content in the A4 solution and the B1 solution is 12.7 mass %. In addition, the content ratio of the fluorine atom in the entire resin layer A4 is also 12.7 mass %.

The molar ratio $[OH_P/OH_A]$ between the content $[OH_A]$ of the hydroxyl group contained in the acrylic resin prepolymer A4 and the content $[OH_P]$ of the hydroxyl group contained in the long-chain polyol is 1.

Comparative Example 1

An acrylic resin prepolymer A5 is synthesized in the same manner as in Example 1, except that the molar ratio of polymerizable monomers, n-butyl methacrylate (nBMA) in synthesis of the acrylic resin prepolymer A1, hydroxyethyl methacrylate (HEMA), and an acrylic monomer having fluorine atom-containing group and a vinyl group (FAMAC 6, manufactured by UNIMATEC CO., LTD.) in Example 1 is changed to 0:3:3.

Further, a resin layer A5 is obtained in the same manner as in Example 1 except that the acrylic resin prepolymer A5 is used.

The hydroxyl value of the acrylic resin prepolymer A5 is 100 mgKOH/g.

The weight average molecular weight of the acrylic resin prepolymer A5 is 16200.

The content ratio of the fluorine atom to the total amount of the solid content in the A5 solution and the solid content in the B1 solution is 17.6 mass %. In addition, the content ratio of the fluorine atom in the entire resin layer A5 is also 17.6 mass %.

The molar ratio $[OH_P/OH_A]$ between the content $[OH_A]$ of the hydroxyl group contained in the acrylic resin prepolymer A5 and the content $[OH_P]$ of the hydroxyl group contained in the long-chain polyol is 1.4.

Comparative Example 2

An acrylic resin prepolymer A6 is synthesized in the same manner as in Example 1, except that the molar ratio of polymerizable monomers, n-butyl methacrylate (nBMA) in synthesis of the acrylic resin prepolymer A1, hydroxyethyl methacrylate (HEMA), and an acrylic monomer having fluorine atom-containing group and a vinyl group (FAMAC 6, manufactured by UNIMATEC CO., LTD.) in Example 1 is changed to 3:3:0.

Further, a resin layer A6 is obtained in the same manner as in Example 1 except that the acrylic resin prepolymer A6 is used.

The hydroxyl value of the acrylic resin prepolymer A6 is 206 mgKOH/g.

The weight average molecular weight of the acrylic resin prepolymer A6 is 17100.

The content ratio of the fluorine atom to the total amount of the solid content in the A6 solution and the solid content in the B1 solution is 0 mass %. In addition, the content ratio of the fluorine atom in the entire resin layer A6 is also 0 mass %.

The molar ratio $[OH_P/OH_A]$ between the content $[OH_A]$ of the hydroxyl group contained in the acrylic resin prepolymer A6 and the content $[OH_P]$ of the hydroxyl group contained in the long-chain polyol is 2.5.

[Evaluation on Resin Layer]—Martens Hardness and Return Rate at 23° C.—

The return rate and Martens hardness are measured for each of the resin layers obtained in the above Examples and Comparative Examples by the following methods. The results are shown in Table 1.

FISCHER SCOPE HM 2000 (manufactured by Fischer Instruments Co., Ltd.) is used as a measuring device, the obtained resin layer is fixed to a slide glass with an adhesive and the two are set in the above measuring device. The resin layer is loaded with 0.5 mN at room temperature (23° C.) over a period of 15 seconds and held at 0.5 mN for 5 seconds. The maximum displacement at this time is set to be (h1). Thereafter, the load is reduced to 0.005 mM for 15 seconds, and held at 0.005 mN for 1 minute. The return rate "[(h1−h2)/h1]×100(%)" is calculated, (h2) being the displacement when held at 0.005 mN for 1 minute. From the load displacement curve at this time, the Martens hardness is obtained.

—Surface Contact Angle [$\theta_{wet}$] and Surface Contact Angle [$\theta_{dry}$]—

In each resin layer obtained in the above Examples and the Comparative Examples, the surface contact angle [$\theta_{dry}$] when water droplets are dropped after standing for 10 hours under an environment of 23° C. and 50% RH and the surface contact angle [$\theta_{wet}$] when the water drops are allowed to stand for 10 minutes, then wiped off, and allowed to stand in an environment of 23° C. and 50% RH for 1 minute and then water droplets are dropped again, are measured by the methods described above. Then, the difference [$\theta_{dry}$]−[$\theta_{wet}$] is obtained.

—Evaluation on Lamination Formability—

The lamination formability is evaluated for each of the resin layers obtained in the above Examples and Comparative Examples by the following methods. The results are shown in Table 1.

After 24 hours from the formation of each resin layer, the same coating liquid (that is, for example, in the case of Example 1, a coating liquid obtained by adding the B1 solution to the A1 solution) is applied in a superimposed manner, and a resin layer (upper layer) is formed by heating and curing. The adhesion of the upper resin layer is evaluated according to JIS K5600-5-6 method: cross-cut method.
A: 0% or more and less than 2%, peel off
B: 2% or more to less than 10%, peel off
C: 10% or more, peel off —Evaluation on Scratch Resistance—

The scratch resistance is evaluated for each of the resin layers obtained in the above Examples and Comparative Examples by the following methods. The results are shown in Table 1.

Each resin layer is rubbed 10 times with a gold brush to confirm scratches after 1 minute and the following grades are evaluated.
A: scratch is confirmed
B: at most 4 scratches that can be confirmed
C: 5 or more scratches that can be confirmed —Evaluation on Antifouling Property—

For each resin layer obtained in the above Examples and Comparative Examples, the contact angle of linoleic acid is measured with a contact angle meter (model number: CA-X, manufactured by Kyowa Interface Science Co., Ltd.), and the antifouling property is evaluated with the following grades. The results are shown in Table 1.
A: contact angle is larger than 60°
B: contact angle is larger than 40° and 60° or less
C: contact angle is less than 40°

TABLE 1

|  | Content ratio of fluorine atom * [mass %] | [$\theta_{dry}$] [°] | [$\theta_{wet}$] [°] | Difference [$\theta_{dry}$] − [$\theta_{wet}$] [°] | Martens hardness [N/mm$^2$] | Return rate [%] | Lamination formability | Antifouling property | Scratch resistance |
|---|---|---|---|---|---|---|---|---|---|
| Example 1 | 2.7 | 105 | 103 | 2 | 3.1 | 94 | A | A | A |
| Example 2 | 5.5 | 108 | 104 | 4 | 2.9 | 91 | A | A | A |
| Example 3 | 1.5 | 101 | 98 | 3 | 2.8 | 93 | A | B | A |
| Example 4 | 12.7 | 115 | 113 | 2 | 3.5 | 75 | B | A | A |
| Comparative Example 1 | 17.6 | 120 | 119.5 | 0.5 | 2.7 | 92 | C | A | A |
| Comparative Example 2 | 0 | 84 | 82 | 2 | 2.9 | 90 | A | C | A |

* content ratio of fluorine atom to total amount of solid content in first solution (A solution) and second solution (B solution)

As shown in Table 1, it is seen that, a surface protective resin member excellent in lamination formability can be obtained in the surface protective resin member of the Examples, which is a cured product of an acrylic resin having a fluorine atom-containing group in the side chain, a long-chain polyol and a polyfunctional isocyanate, and in which the content ratio of the fluorine atom to the total amount of the solid content in the first solution (A solution) and the solid content in the second solution (B solution) is 15 mass % or less, and the difference $[\theta_{dry}]-[\theta_{wet}]$ is 1° or more, compared with the surface protective resin member in Comparative Example 1 in which the content ratio of the fluorine atom to the total amount of the solid content in the first solution (A solution) and the solid content in the second solution (B solution) exceeds 15 mass %. It is also seen that, a surface protective resin member excellent in antifouling property can be obtained, compared with the surface protective resin member in Comparative Example 2 in which the content ratio of the fluorine atom to the total amount of the solid content in the first solution (A solution) and the solid content in the second solution (B solution) is less than 15 mass %.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A solution set for forming a surface protective resin member, the solution set comprising
a first solution containing:
an acrylic resin having a hydroxyl value of 40 to 280 and having a fluorine atom-containing group on a side chain of the acrylic resin; and
a polyol having a plurality of hydroxyl groups bonded via a carbon chain having 6 or more carbon atoms, and
a second solution containing a multifunctional isocyanate, wherein
a content ratio of the fluorine atom to a total amount of a solid content in the first solution and a solid content in the second solution is 0.5 mass % to 15 mass %, as measured by heating, drying, and curing a mixture of the first solution and the second solution and then performing X-ray photoelectron spectroscopy (XPS) while etching with duster argon.

2. The solution set for forming a surface protective resin member according to claim 1, wherein the acrylic resin has a structure in which polymerizable monomers having the fluorine atom-containing group and a vinyl group are polymerized.

3. The solution set for forming a surface protective resin member according to claim 2, wherein in the acrylic resin, a proportion of a side chain having 6 or more carbon atoms in a side chain portion of the acrylic resin among all side chains not containing a fluorine atom and having a hydroxyl group is 5 mol % or less.

4. The solution set for forming a surface protective resin member according to claim 1, wherein the acrylic resin has a weight average molecular weight of 5000 to 100000.

5. The solution set for forming a surface protective resin member according to claim 1, wherein a molar ratio $[OH_P]/[OH_A]$ of a content $[OH_P]$ of the hydroxyl group contained in the polyol to a content $[OH_A]$ of the hydroxyl group contained in the acrylic resin is 0.1 to 10.

6. The solution set for forming a surface protective resin member according to claim 1, wherein at least one of the first solution and the second solution contains an antistatic agent.

7. The solution set for forming a surface protective resin member according to claim 1, wherein at least one of the first solution and the second solution contains a reaction accelerator for accelerating a reaction between the hydroxyl groups in the acrylic resin and the polyol and the isocyanate group in the polyfunctional isocyanate.

8. The solution set for forming a surface protective resin member according to claim 2, wherein the acrylic resin has a weight average molecular weight of 5000 to 100000.

9. The solution set for forming a surface protective resin member according to claim 3, wherein the acrylic resin has a weight average molecular weight of 5000 to 100000.

10. The solution set for forming a surface protective resin member according to claim 2, wherein a molar ratio $[OH_P]/[OH_A]$ of a content $[OH_P]$ of the hydroxyl group contained in the polyol to a content $[OH_A]$ of the hydroxyl group contained in the acrylic resin is 0.1 to 10.

11. The solution set for forming a surface protective resin member according to claim 3, wherein a molar ratio $[OH_P]/[OH_A]$ of a content $[OH_P]$ of the hydroxyl group contained in the polyol to a content $[OH_A]$ of the hydroxyl group contained in the acrylic resin is 0.1 to 10.

12. The solution set for forming a surface protective resin member according to claim 4, wherein a molar ratio $[OH_P]/[OH_A]$ of a content $[OH_P]$ of the hydroxyl group contained in the polyol to a content $[OH_A]$ of the hydroxyl group contained in the acrylic resin is 0.1 to 10.

13. The solution set for forming a surface protective resin member according to claim 2, wherein at least one of the first solution and the second solution contains an antistatic agent.

14. The solution set for forming a surface protective resin member according to claim 3, wherein at least one of the first solution and the second solution contains an antistatic agent.

15. The solution set for forming a surface protective resin member according to claim 4, wherein at least one of the first solution and the second solution contains an antistatic agent.

* * * * *